US00RE34019E

United States Patent [19]

Kuklies et al.

[11] E Patent Number: Re. 34,019

[45] Reissued Date of Patent: Aug. 4, 1992

[54] THERMOPLASTIC BAG

[75] Inventors: Milton C. Kuklies; William G. Orem, both of Fairport, N.Y.

[73] Assignee: Mobil Oil Corporation, Fairfax, Va.

[21] Appl. No.: 746,452

[22] Filed: Aug. 16, 1991

Related U.S. Patent Documents

Reissue of:

[64] Patent No.: 4,165,832
Issued: Aug. 28, 1979
Appl. No.: 922,949
Filed: Jul. 10, 1978

U.S. Applications:

[63] Continuation of Ser. No. 313,258, Feb. 23, 1989, abandoned, which is a continuation of Ser. No. 296,750, Aug. 27, 1981, abandoned, which is a continuation-in-part of Ser. No. 889,319, Mar. 23, 1978, abandoned.

[51] Int. Cl.[5] ..... B65D 33/06

[52] U.S. Cl. ..... 383/8; 206/554; 383/903

[58] Field of Search ..... 188/66; 53/384–386, 53/390; 206/554; 150/107–110; 383/6–10, 22, 24, 120, 903; D3/42; D9/305, 306

[56] References Cited

U.S. PATENT DOCUMENTS

| | | |
|---|---|---|
| 1,808,375 | 6/1931 | Plooster . |
| 2,019,197 | 10/1935 | Spanel . |
| 3,180,557 | 4/1965 | Thulin . |
| 3,298,416 | 1/1967 | Grady . |
| 3,312,339 | 4/1967 | Million . |
| 3,352,411 | 11/1967 | Schwarzkopf . |
| 3,358,904 | 12/1967 | Van Houtte . |
| 3,774,837 | 11/1973 | Franson . |
| 4,062,170 | 12/1977 | Orem . |
| 4,085,822 | 4/1978 | Osborn . |
| 4,136,723 | 1/1979 | Skaadel et al. . |

FOREIGN PATENT DOCUMENTS

| | | |
|---|---|---|
| 1844267 | 8/1961 | Fed. Rep. of Germany . |
| 1496589 | 9/1967 | France . |
| 61848 | 5/1968 | German Democratic Rep. . |
| 47-30024 | 9/1972 | Japan . |
| 47-40984 | 12/1972 | Japan . |
| 405057 | 7/1966 | Switzerland . |

*Primary Examiner*—Stephen Marcus
*Attorney, Agent, or Firm*—A. J. McKillop; C. J. Speciale; J. P. O'Sullivan, Sr.

[57] ABSTRACT

The present invention relates to thermoplastic bag structures which are characterized by having a pair of carrying handles which are formed integrally with the bag walls, and extend upwardly from the open mouth portion of the bag. The configuration of the individual bag handles is such that there is reduced tendency for that portion of the handle which is in the user's palm, when such bags are loaded are carried, to curl into a small cross sectional area, commonly known as roping. Additionally, the individual bags are constructed so that when the bags are loaded and being carried by the user, the stress points around the bag mouth are distributed to areas which are less likely to rupture and tear as a result of stress concentration.

4 Claims, 4 Drawing Sheets

Prior Art

Figure 6-A

Present Invention

Figure 7-A

THERMOPLASTIC BAG

Matter enclosed in heavy brackets [ ] appears in the original patent but forms no part of this reissue specification; matter printed in italics indicates the additions made by reissue.

*This reissue application is a continuation application of reissue application Ser. No. 07/313,258, filed Feb. 23, 1989, abandoned which is a continuation of reissue application Ser. No. 296,750, filed Aug. 27, 1981, abandoned which in turn is a reissue application based upon U.S. Pat. No. 4,165,832, issued Aug. 28, 1979, from application Ser. No. 06/922,949, filed Jul. 10, 1978, which in turn is a continuation-in-part application of Design application Ser. No. 05/889,319, filed Mar. 23, 1978, abandoned.*

1. FIELD OF THE INVENTION

The present invention relates to handled thermoplastic bag structures and thermally welded individual packs of such bag structures. The structure of the bag mouth is especially designed to avoid stress concentration, while the bag is under load, in areas which are susceptible to bag splitting and tearing, as a result of such loads.

2. DESCRIPTION OF THE PRIOR ART

In the past bags which were characterized by having carrying handles thereon were constructed using separate handle elements, distinct from the bag structure itself, which were fed for attachment adjacent to the open mouth portion of the bag. The manufacturing operation to produce such prior art structures with the separate process set of supplying handling element and applying them to the bag was quite cumbersome and uneconomical. More recently however, bag structures have been developed, see for example U.S. Pat. Nos. 4,085,822; 3,352,411 and 3,180,557; the disclosures of which are incorporated herein by reference, wherein bags are formed so that the handle carrying elements are formed as an integral part of the bag structure itself, that is to say the handles are actually an extension of the bag proper. An example of such a bag structure is one that is constructed from a flattened tube or a flattened side edge gusseted tube. A flattened portion of such a tube is cut off and sealed along its bottom edge. Conversely, such a bag may be formed by folding a piece of the thermoplastic material on itself, the bottom fold line constituting the bottom part of the bag and heat sealing the upper edge and side wall parts of the bag together. Next a U shaped cutout is made in the upper portion of the bag to provide an opening or entrance, for the introduction of goods to be packaged. The opposite edges of the upper portion of the bag structure immediately adjacent to the cutout area form loops which may be used to carry such bag structures when they are loaded. In the case of a gusseted tube such handle loops are reinforced, i.e. double ply thickness, by virtue of the presence of the reentrant or gusset fold in the loop handle members.

Such aforedescribed prior art bag structures present carrying problems for the end user, particularly since such structures are made from extremely thin thermoplastic material i.e., on the order of 0.75 mils or less, there is a tendency of the handle material to roll up and rope in the hand of the carrier. Additionally such prior art bag structures have a tendency to tear at areas adjacent to the lower portion of the bag handles where carrying stress forces have a tendency to concentrate.

SUMMARY OF THE INVENTION

The bag structures of the present invention eliminates or substantially reduce the severity of the structural deficiencies of the prior art handle bags discussed hereinabove. The present bag structures are provided with increased amounts of thermoplastic material in the upper handle areas to substantially reduce the roping tendency of this portion of the handle area when loaded bags are being carried or transported by the user. Further, the open mouth portion of the present handle bag structures is particularly designed to eliminate the concentration of stress forces in those areas of the bag mouth which are especially susceptible to splitting and tearing.

DESCRIPTION OF SPECIFIC EMBODIMENTS

Figure 1:
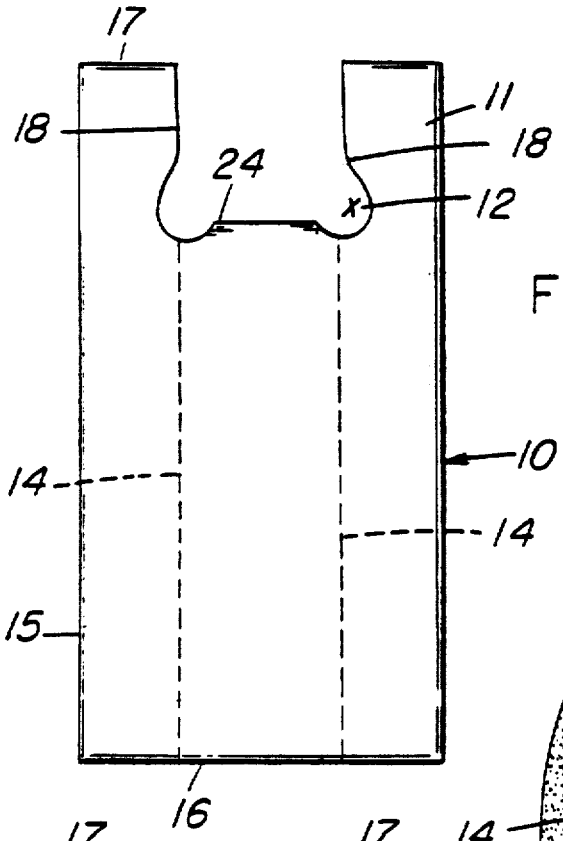
FIG. 1 is a front elevation view of one form of the bag structures of the present invention.
Figure 2:
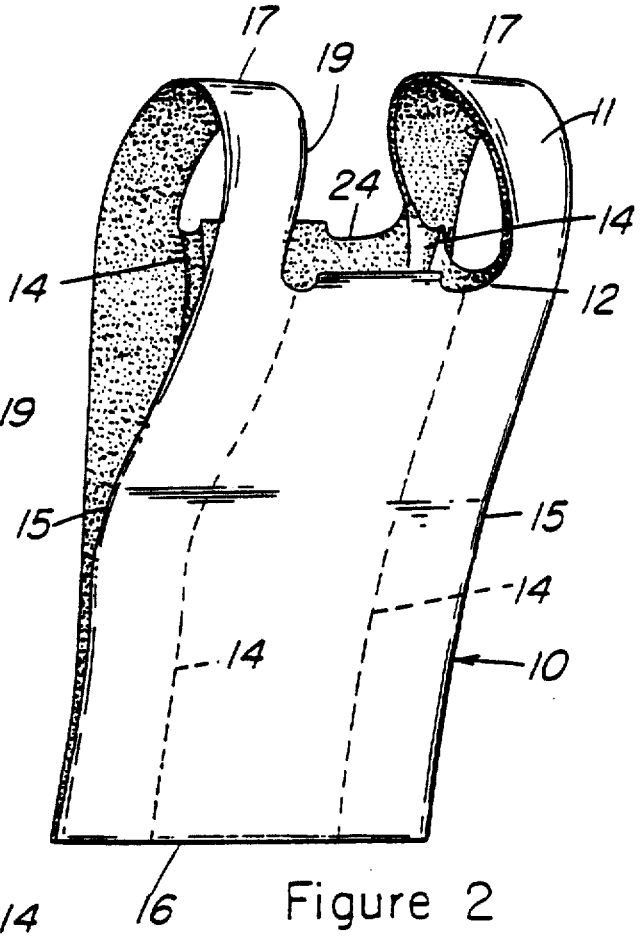
FIG. 2 is a perspective view of the bag illustrated in FIG. 1 in a partially open position.

One form of the bag structure of the present invention, shown in FIGS. 1 and 2 of the accompanying drawings, generally comprises a bag fabricated from a flattened gusseted thermoplastic tube. Such bags comprise attached upper bag handle members 11 which are sealed along their upper edges at 17. The bag bottom portion is also sealed along the area designated as 16. The side edges 15 of the bag structure comprise inwardly folded gussets 14, which allow for bag expansion when the bags are being loaded and, in the present instance, provides a double ply thickness to reinforce and strengthen handle members 11. As shown in FIGS. 1 and 2, the upper portion of the bag structures have been cut away to form a bag mouth opening. In the bag structures of the present invention, it will be noted that the upper portions of handle members 11 are wider at their top than at their base in the area adjacent the lower most portion of the cut away area.

Figure 4:
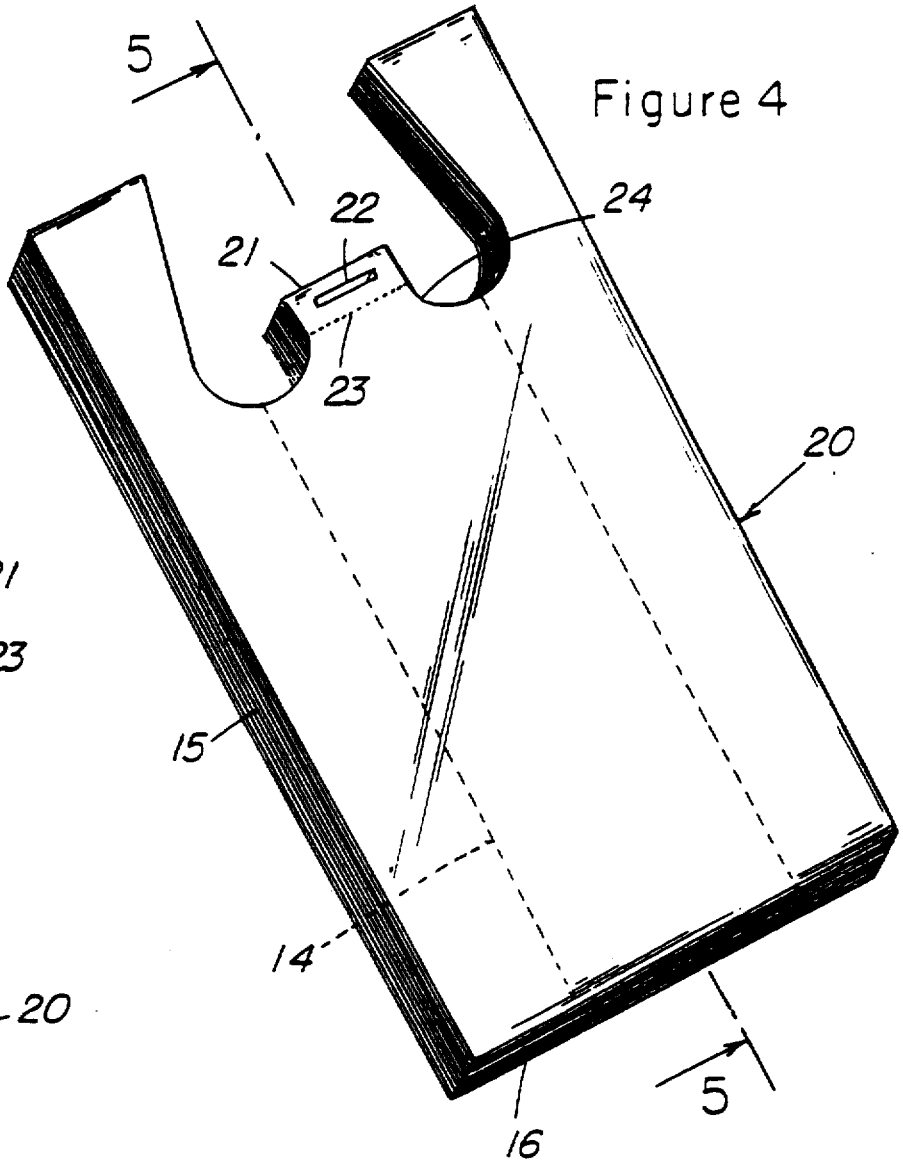
FIG. 4 is a perspective view of an assembled package of bags in accordance with the present invention.
Figure 5:
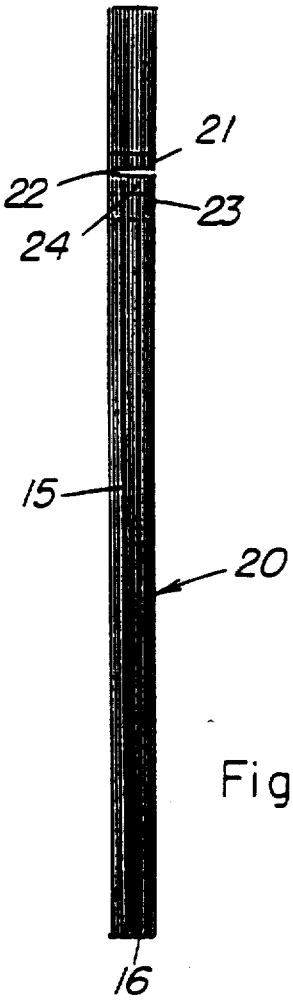
FIG. 5 is a cross sectional view taken on line 5—5 of FIG. 4.

The bag structures of the present invention may be formed into convenient unitary bag packs, as shown in FIGS. 4 and 5. Such bag packs are formed by providing a detachable tab member 21 which may be conveniently formed during the cut-out operation employed to form the open mouth portions of the bag structures. Detachable tab member 21 is attached by a perforated area 23 to the main bag structure 10. A plurality of such bags may be formed into discrete unitized bag packs by, for example, heat welding and penetration of detachable tabs 21 to form an aperture 22, whereby the bags become joined together by virtue of thermoplastic melting and flowing around the periphery of aperture 22. This may be accomplished by utilizing conventional techniques such as penetrating a plurality of the detachable tabs 21 in areas 22, utilizing a heated blade element which is heated to a temperature to cause penetration of the blade through tabs 21 while fusing the peripheral areas of apertures 22 together. The resultant aperture 22 may be employed to suspend or support the individual bag packs 20 by extending a support element (not shown) through aperture 22. When it is desired to remove an individual bag from the pack (shown in FIG. 4), front wall of the uppermost bag is torn free from its tab 21 along perforated area 23. The rear bag wall may remain attached to tab 21 during loading operations. After loading the filled bag may be completely separated from the pack by tearing away, along perforated area 23, the rear bag wall from detachable tab 21. The uppermost bag in the pack is simply torn away along perforated area 23. Conversely, dependent upon the type of bag loading operation, it may be preferred to initially remove the front wall of an individual bag from pack 20 by tearing the front wall of the bag along area 23, extending the front wall to provide a load opening and, after the individual bag has been loaded, completely removing the bag from bag pack 20 by severing the still connected rear wall of the individual bag along perforated area 23.

In accordance with one aspect of the present invention, removal of the individual bag 10 or bag pack 20, results in the formation of upwardly extending tabs 24, as shown in FIGS. 1 and 2, which are positioned adjacent the open mouth portion of the bag, on both the front and rear walls of the bag. Adjacent each end of tabs 24 are stress relief notches *or arcuate areas* 12, whose function is described in detail hereinafter.

It will be noted that in the bag structure of the present invention a means is provided to reduce the roping of the handles in thin gauge thermoplastic handle bags. When the handles of typical prior art handle bags are subjected to heavy bag loads and, when carried, are additionally subjected to a rolling of the handles across the palm of the hand of the carrier, there is a tendency for the film in the handle region to assume a minimum cross-sectional area, thus, to form a round cross-section with a small diameter.

This configuration is referred to hereinafter as a "rope". The undesirable effects of such a roping tendency resides primarily in the fact that the weight of the loaded bag is then supported over the relatively small diameter of the ropes and thus approximates point loadings across the palm of the hand of the carrier. This roping tendency increases proportionally as the gauge of the thermoplastic material in the handle portion of the bag is reduced. For obvious economic reasons it is preferred to prepare such disposable thermoplastic handle bags with as little resinous material as is possible, i.e. the thinnest gauge possible consistent with satisfactory performance.

In accordance with one aspect of the present invention, means are provided to add more cross-sectional bulk in the handle region to compensate for the reduction in bulk attendant to gauge reduction and reduced rope diameter as a result of such gauge reduction. As particularly shown in FIGS. 1, 2, and 3 of the accompanying drawings the increase in bulk in accordance with the present invention is accomplished by making the upper portions of handle members 11 wider in the regions where the palm of the hand would typically be placed to carry the loaded bag. It will be noted that in FIGS. 1 through 3 the inside portions of handle members 11 in the areas generally designated as 18 and 19 are tapered inwardly towards the side edges 15 of the bag structures. Such inward tapering provides a means for increasing the width of the upper portion of handle elements 11 while maintaining a sufficient width of bag opening at the base of handle members 11 to permit ease of loading of products through the open bag mouth.

Figure 3:
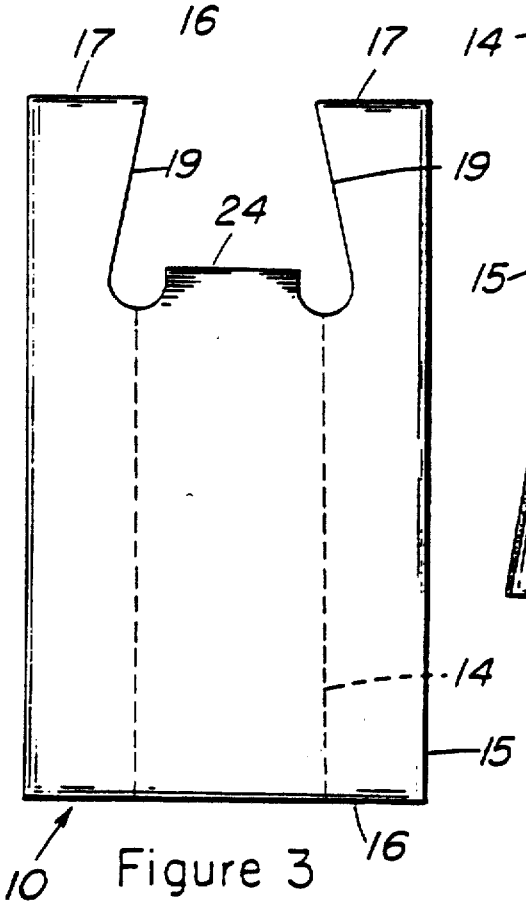
FIG. 3 is a front elevation view of a modified form of the bag structure illustrated in FIG. 1.

It will be noted that the difference in structure between the bag illustrated in FIG. 1 and that illustrated in FIG. 3 resides solely in the design of the taper on the inside of bag handle 11. In the case of FIG. 3 this taper is uniform and continuous from the top of the handle 11 to the base thereof adjacent the radius stress relief notch 12 whereas in the case of the handles shown in FIG. 1 the taper is provided by an abrupt radius curvature at point 18 flowing into stress relief notch 12.

Figure 8:
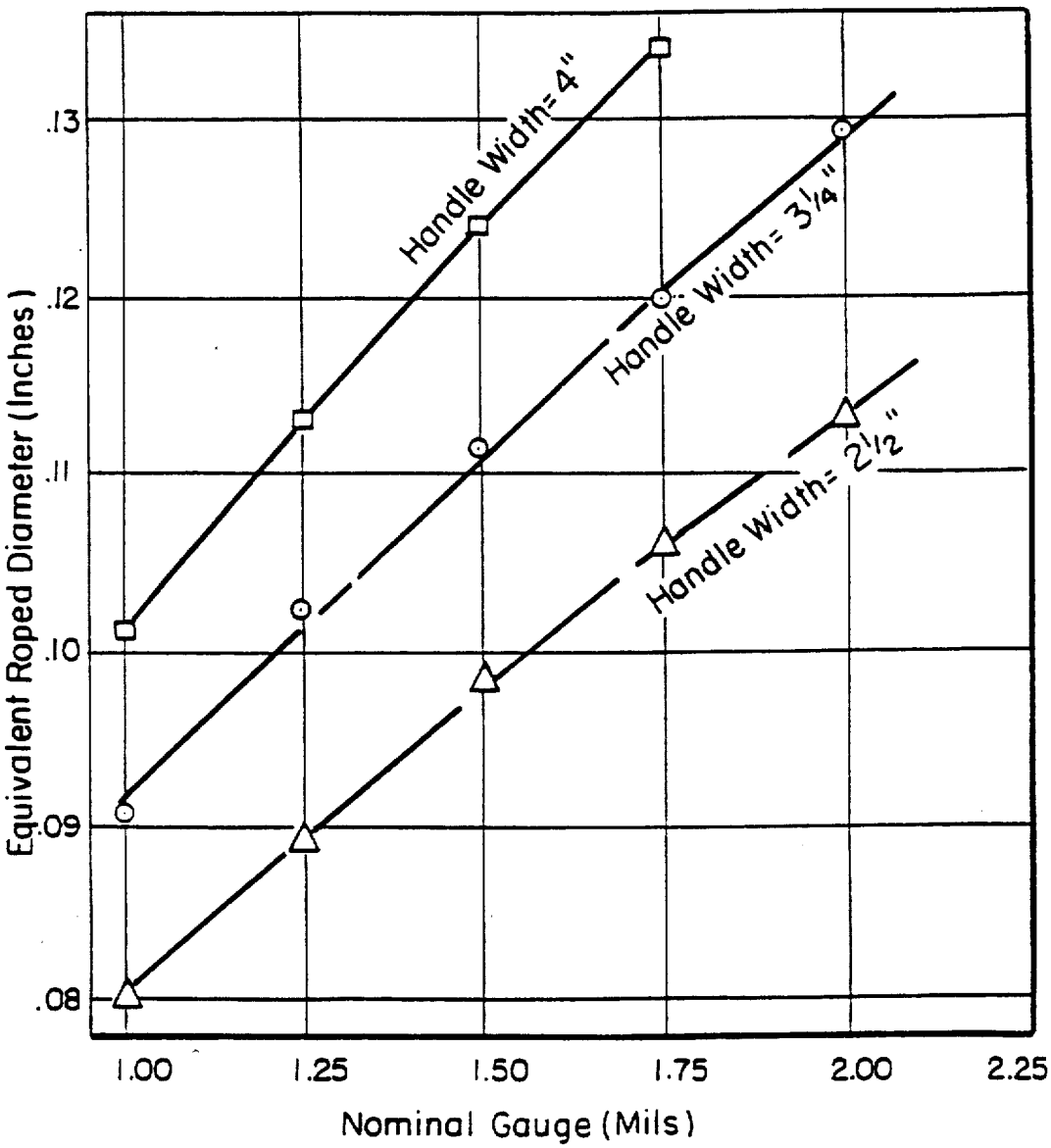
FIG. 8 is a graphic representation of the effects of bag handle width and film gauge on the roping tendency of the upper portions of the bag handles on the bag structures of the present invention.

Accompanying FIG. 8 sets forth in graphic form the effects of varying gauge on the rope diameter assumed by handle elements 11 when a loaded bag is manually transported. The following formula has been found to be an accurate means of calculating the effect of the rope diameter on gauge variation, the diameter being computed as follows:

$$D = \sqrt{\frac{\delta WG}{\pi}}$$

with:

D = equivalent diameter of the "rope" (in.)
W = Handle width (in.)
G = gauge (in.)

As shown in accompanying FIG. 8 as the gauge of thermoplastic material, in the present instance low density polyethylene, is reduced the rope diameter decreases. However, as the width of the upper portion of handle 11 is increased the pronounced reduction in rope diameter, as the gauge is reduced, is not as severe whereby the concentrated palm pressure exerted by the handles of a loaded bag is proportionally reduced.

Figure 6:
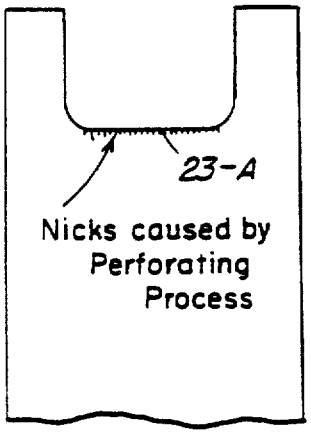
FIGS. 6 and 6-A are schematic representations of prior art bag structures.

As shown in FIGS. 6 and 6-A, prior art bag structures which have been assembled into unitized packs and retained in pack form utilizing a detachable tab 21 which was joined to the main bag body by a perforated area 23-A, located immediately adjacent the bag mouth, when removed from such a pack were characterized by having nicks or small tears along the mouth portion of the bag as a result of having been perforated in that area. As particularly illustrated in FIG. 6-A, when such bags were loaded and subjected to the normal carrying stresses and forces encountered along the perimeter of the bag mouth, there is a pronounced tendency for such forces to concentrate at a stress point S. Since, in this area of the prior art bags, an initial tear in the form of a nick caused by the perforation operation is already present, such prior art bag structures were particularly prone to rupture and tear.

Figure 7:
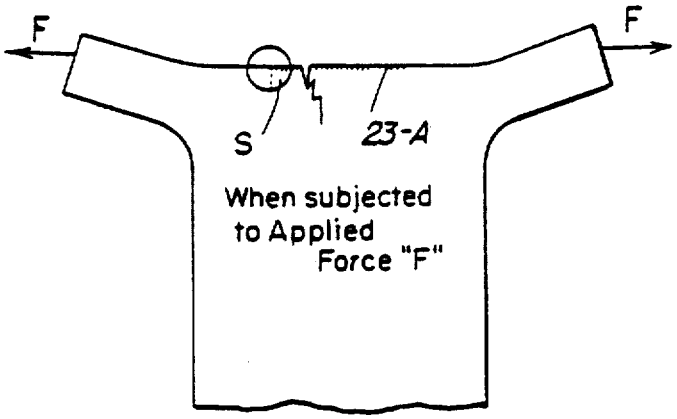
FIGS. 7 and 7-A are schematic representations of the bag structures of the present invention.
Figure 7:
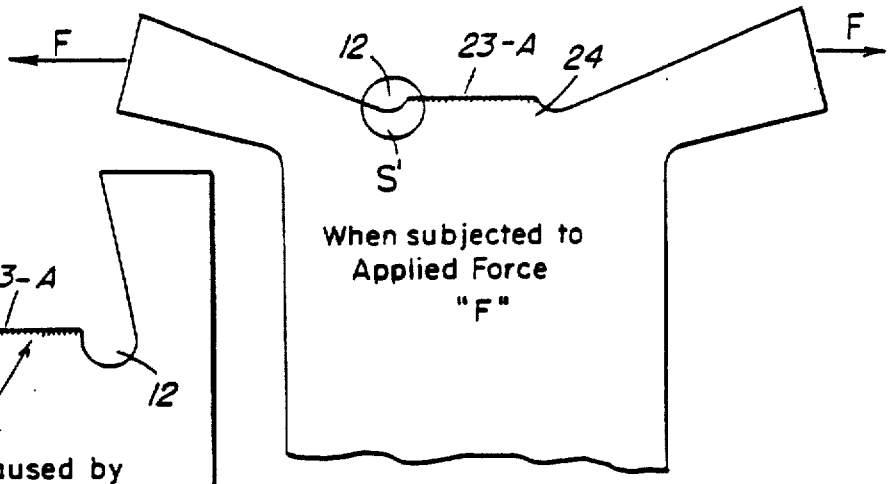
Figure 7:
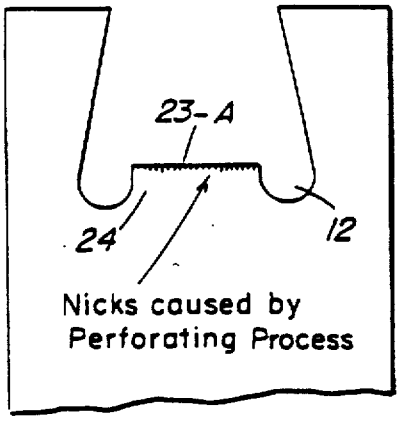

Conversely, in accordance with the bag structures of the present invention, as illustrated in FIGS. 7 and 7-A, by reason of the presence of a stress relief notch 12 and also by virtue of the fact that the perforated mouth area is restricted to a confined location, i.e., attached to upwardly extending attached tab 24, when normal stresses, e.g., as a result of being loaded and carried, are applied to the loaded bag structures of the present invention, the stresses tend to concentrate in area S'. Since in this area S' there are no nicks or slight tears as a result of the perforation operation, there is a pronouncedly reduced tendency of the present bag structures to tear during normal loading and carrying operations.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A [thermoplastic] bag structure comprising a front and rear bag wall and an open mouth top portion, said open mouth portion being characterized by having handles which are located on opposite ends of said open mouth portion, said handles being integral extensions of said front and rear bag walls, said bag being further characterized in that the upper portion of each of said handles is substantially wider than the lower portion of said bag handles said lower portions being located adjacent opposite ends of said bag mouth; said bag mouth being further characterized by having stress relief notches positioned at opposite ends of said mouth, the upper edges of said mouth extending above said stress relief notches.

2. A bag structure in accordance with claim 1 wherein said front and rear walls are joined together by an integral pleat portion.

*3. A handle bag comprising a front and rear bag wall and an open mouth top portion, said open mouth portion being characterized by having handles which are located on opposite ends of said open mouth portion, said handles being integral extensions of said front and rear bag wall, said bag being further characterized in that the upper portion of each of said handles is substantially wider than the lower portion of said bag handles, said lower portions being located adjacent opposite ends of said bag mouth; said bag mouth being further characterized by having arcuate areas positioned at opposite ends of said mouth and adjacent the lower portions of said handles, said handles extending upwardly and inwardly from said arcuate areas, and the upper edges of said mouth extending above said arcuate areas and being located closer to the lower portion of said handles than to said upper portion of said handles.*

*4. In a bag structure comprising front and rear bag walls joined together to form a bag bottom, an open mouth top portion opposite to said bottom, said top portion characterized by having handles which are integral extensions of said front and rear walls, said handles having lower portions located at opposite ends of said open mouth and having upper portions located farther away from said bottom than is said open mouth; the improvement which comprises, said bag mouth being further characterized by having arcuate areas positioned at opposite ends of said mouth and adjacent the lower portions of said handles, said handles extending upwardly from one end of said arcuate areas, said bag mouth extending above said arcuate areas and having upper edges which are located closer to said lower portions of the handles than to said upper portions of said handles.*

* * * * *